(12) United States Patent
Baur

(10) Patent No.: US 12,157,414 B2
(45) Date of Patent: *Dec. 3, 2024

(54) METHOD FOR ASSEMBLING AN ELECTROCHROMIC MIRROR REFLECTIVE ELEMENT

(71) Applicant: Magna Mirrors of America, Inc., Holland, MI (US)

(72) Inventor: Michael J. Baur, Kentwood, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,925

(22) Filed: Dec. 21, 2023

(65) Prior Publication Data

US 2024/0116445 A1 Apr. 11, 2024

Related U.S. Application Data

(63) Continuation of application No. 18/051,098, filed on Oct. 31, 2022, which is a continuation of application No. 17/301,555, filed on Apr. 7, 2021, now Pat. No. 11,485,289.

(60) Provisional application No. 63/006,744, filed on Apr. 8, 2020.

(51) Int. Cl.
*B60R 1/08* (2006.01)
*B60R 1/072* (2006.01)

(52) U.S. Cl.
CPC .............. *B60R 1/088* (2013.01); *B60R 1/072* (2013.01)

(58) Field of Classification Search
CPC ................................ B60R 1/088; B60R 1/072
See application file for complete search history.

(56) References Cited

U.S. PATENT DOCUMENTS

| | | | |
|---|---|---|---|
| 4,712,879 | A | 12/1987 | Lynam et al. |
| 5,066,112 | A | 11/1991 | Lynam et al. |
| 5,073,012 | A | 12/1991 | Lynam |
| 5,076,673 | A | 12/1991 | Lynam et al. |
| 5,115,346 | A | 5/1992 | Lynam |
| 5,140,455 | A | 8/1992 | Varaprasad et al. |
| 5,142,407 | A | 8/1992 | Varaprasad et al. |
| 5,151,816 | A | 9/1992 | Varaprasad et al. |
| 5,253,109 | A | 10/1993 | O'Farrell et al. |

(Continued)

*Primary Examiner* — Sath V Perungavoor
*Assistant Examiner* — Tyler B Edwards
(74) *Attorney, Agent, or Firm* — HONIGMAN LLP

(57) ABSTRACT

A method for assembling an electrochromic mirror reflective element includes providing front and rear glass substrates, disposing a transparent electrically conductive coating at a second surface of the front glass substrate, and disposing an electrically conductive coating at a third surface of the rear glass substrate. The front and rear glass substrates are joined via a perimeter seal and an electrochromic medium is disposed within an interpane cavity established between the front glass substrate and the rear glass substrate and bounded by the perimeter seal. With the front glass substrate joined with the rear glass substrate, and with the electrochromic medium disposed within the interpane cavity, the first and second perimeter edges are ground to round the first and second perimeter edges to provide a rounded perimeter edge of the electrochromic mirror reflective element that has a radius of curvature of at least 2.5 mm.

39 Claims, 16 Drawing Sheets

(56) References Cited

U.S. PATENT DOCUMENTS

| | | |
|---|---|---|
| 5,406,414 A | 4/1995 | O'Farrell et al. |
| 5,525,264 A | 6/1996 | Cronin et al. |
| 5,567,360 A | 10/1996 | Varaprasad et al. |
| 5,610,756 A | 3/1997 | Lynam et al. |
| 5,668,663 A | 9/1997 | Varaprasad et al. |
| 5,724,187 A | 3/1998 | Varaprasad et al. |
| 5,910,854 A | 6/1999 | Varaprasad et al. |
| 6,002,511 A | 12/1999 | Varaprasad et al. |
| 6,154,306 A | 11/2000 | Varaprasad et al. |
| 6,178,034 B1 | 1/2001 | Allemand et al. |
| 6,690,268 B2 | 2/2004 | Schofield et al. |
| 7,184,190 B2 * | 2/2007 | McCabe .............. G02F 1/157 359/267 |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,360,932 B2 | 4/2008 | Uken et al. |
| 7,581,859 B2 | 9/2009 | Lynam |
| 7,626,749 B2 | 12/2009 | Baur et al. |
| 7,944,371 B2 | 5/2011 | Foote et al. |
| 8,049,640 B2 | 11/2011 | Uken et al. |
| 8,058,977 B2 | 11/2011 | Lynam |
| 8,277,059 B2 | 10/2012 | McCabe et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 8,915,601 B2 | 12/2014 | Foote et al. |
| 9,346,403 B2 | 5/2016 | Uken et al. |
| 9,565,342 B2 | 2/2017 | Sauer et al. |
| 9,598,016 B2 | 3/2017 | Blank et al. |
| 9,827,913 B2 | 11/2017 | De Wind et al. |
| 9,878,669 B2 | 1/2018 | Kendall |
| 10,099,618 B2 | 10/2018 | Foote et al. |
| 10,466,563 B2 | 11/2019 | Kendall et al. |
| 11,485,289 B2 * | 11/2022 | Baur .................. B60R 1/072 |
| 11,858,422 B2 * | 1/2024 | Baur .................. B60R 1/088 |
| 2006/0061008 A1 | 3/2006 | Karner et al. |
| 2009/0251785 A1 * | 10/2009 | Bruhnke .............. B60R 1/088 359/603 |
| 2012/0038964 A1 * | 2/2012 | De Wind .............. B24B 9/08 359/872 |
| 2012/0236388 A1 * | 9/2012 | De Wind ........... G02F 1/13338 359/267 |
| 2013/0170013 A1 * | 7/2013 | Tonar ................. G02F 1/161 359/296 |
| 2014/0055836 A1 * | 2/2014 | Cammenga ............ G02F 1/161 359/267 |
| 2014/0313563 A1 * | 10/2014 | Uken .................. B60R 1/088 359/267 |
| 2015/0097955 A1 | 4/2015 | De Wind et al. |
| 2015/0321611 A1 * | 11/2015 | Lock .................. G02F 1/157 359/267 |
| 2015/0334354 A1 * | 11/2015 | Uken .................. B60R 1/04 348/148 |
| 2018/0319339 A1 | 11/2018 | Baur |
| 2020/0353867 A1 | 11/2020 | Huizen et al. |

\* cited by examiner

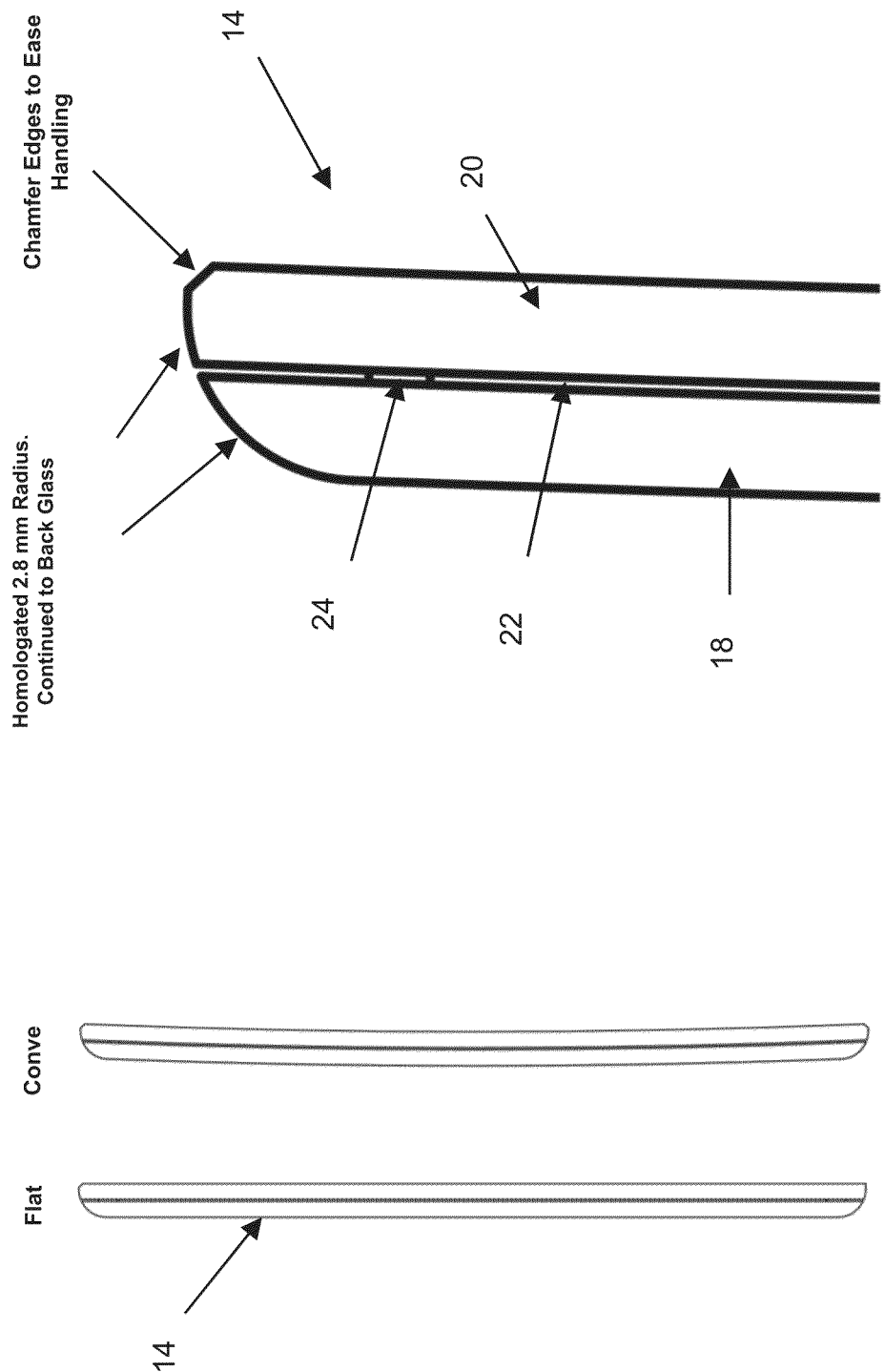

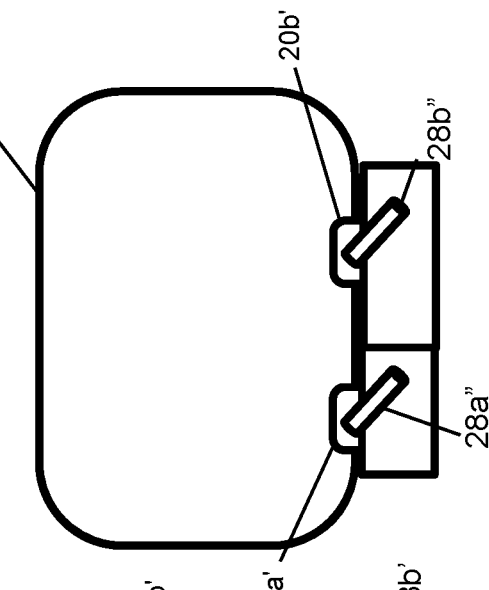
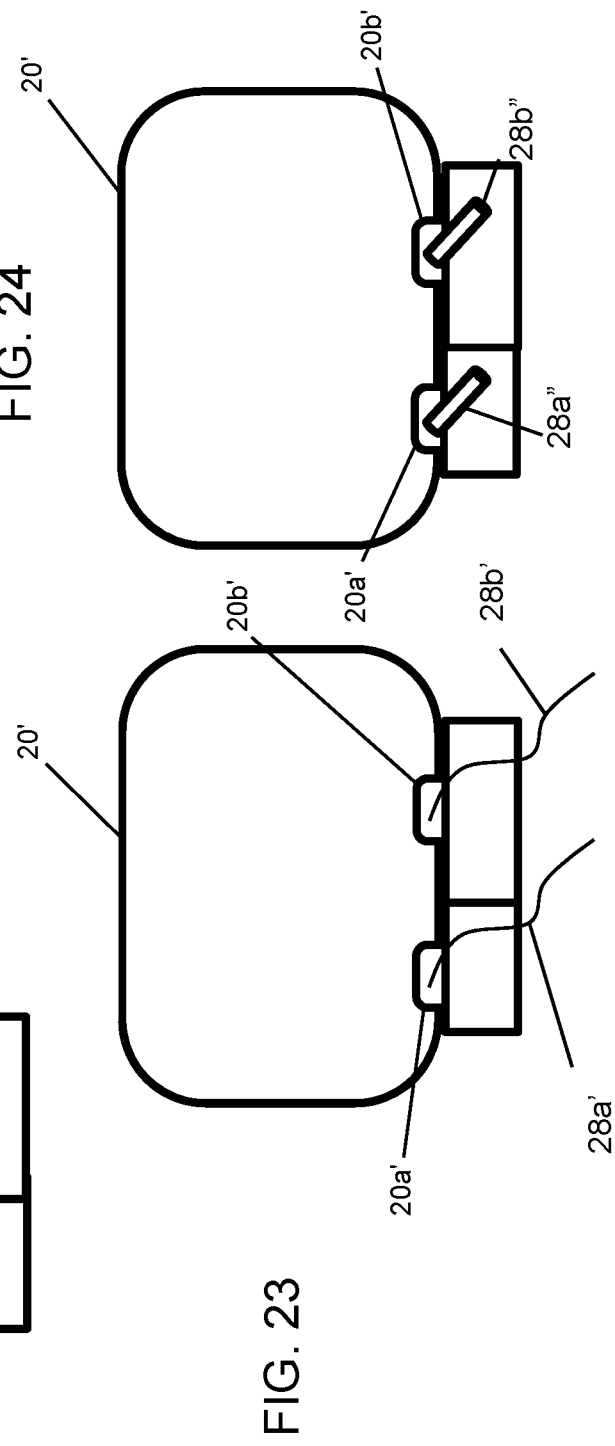
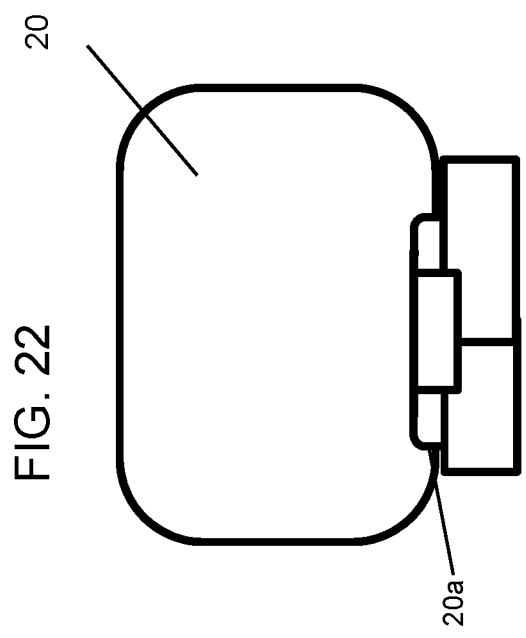

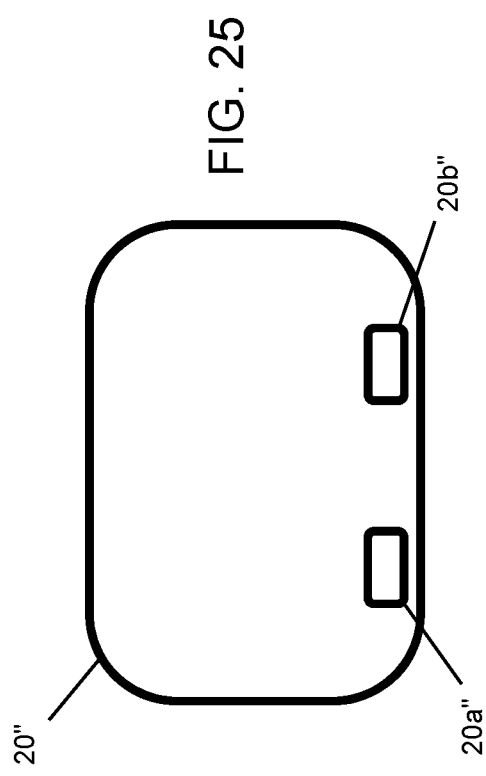
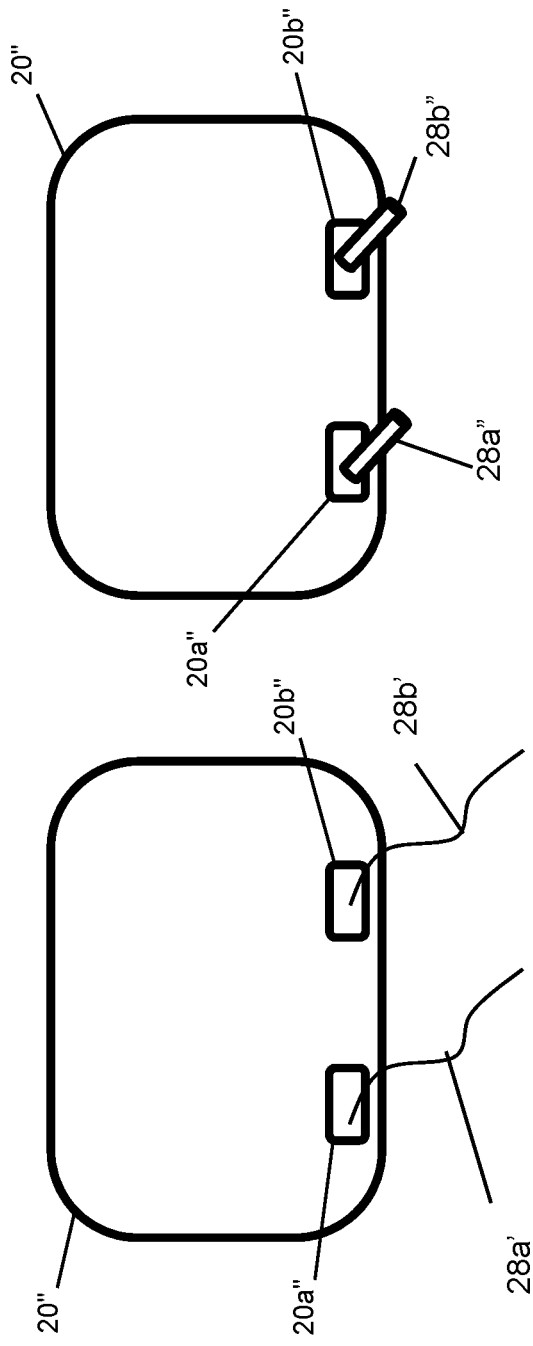

METHOD FOR ASSEMBLING AN ELECTROCHROMIC MIRROR REFLECTIVE ELEMENT

CROSS REFERENCE TO RELATED APPLICATIONS

The present application is a continuation of U.S. patent application Ser. No. 18/051,098, filed Oct. 31, 2022, now U.S. Pat. No. 11,858,422, which is a continuation of U.S. patent application Ser. No. 17/301,555, filed Apr. 7, 2021, now U.S. Pat. No. 11,485,289, which claims the filing benefits of U.S. provisional application Ser. No. 63/006,744, filed Apr. 8, 2020, which is hereby incorporated herein by reference in its entirety.

FIELD OF THE INVENTION

The present invention relates generally to the field of exterior rearview mirror assemblies for vehicles.

BACKGROUND OF THE INVENTION

It is known to provide a variable reflectance mirror reflective element for an interior or exterior rearview mirror assembly of a vehicle. It is also known to provide a rounded or curved exposed perimeter edge of a front substrate of the mirror reflective element, with the rear substrate nested in the mirror casing at which the mirror reflective element is mounted.

SUMMARY OF THE INVENTION

The present invention provides a rearview mirror assembly that has a variable reflectance electro-optic mirror reflective element with an exposed rounded perimeter or circumferential edge, with the rounded or curved perimeter regions spanning the perimeter of the front glass substrate and at least a portion of the perimeter edge of the rear glass substrate. The rounded or curved perimeter regions of the front and rear glass substrates cooperate or combine to provide a curved transition between an outer surface of the mirror casing and a front surface of the front glass substrate. The mirror assembly includes enhanced or improved electrical connectors established at the rear of the reflective element and in electrical connection with the conductive coating or coatings at the rear of the front glass substrate and at the front and/or rear of the rear glass substrate. Aspects of the present invention are suitable for an exterior rearview mirror assembly and/or an interior rearview mirror assembly.

These and other objects, advantages, purposes and features of the present invention will become apparent upon review of the following specification in conjunction with the drawings.

BRIEF DESCRIPTION OF THE DRAWINGS

FIG. 7 shows side elevations of reflective elements having a rounded outermost perimeter edge that is formed by rounding the peripheries of both the front and rear glass substrates;

FIG. 8 is an enlarged portion of one of the reflective elements of FIG. 7;

FIG. 22 is a plan view of the rear glass substrate, showing a cutout region along the lower perimeter edge for allowing electrical connection to the electrically conductive coatings of the reflective element;

FIG. 23 is a plan view of another rear glass substrate, showing separate cutout regions and electrical leads thereat;

FIG. 24 is another plan view of the rear glass substrate, showing spring loaded connectors at respective cutout regions;

FIG. 25 is a plan view of the rear glass substrate, showing apertures inboard from the lower perimeter edge for allowing electrical connection to the electrically conductive coatings of the reflective element;

FIG. 26 is a plan view of another rear glass substrate, showing electrical leads at respective apertures; and FIG. 27 is another plan view of the rear glass substrate, showing spring loaded connectors at respective apertures.

DESCRIPTION OF THE PREFERRED EMBODIMENTS

Figure 1:
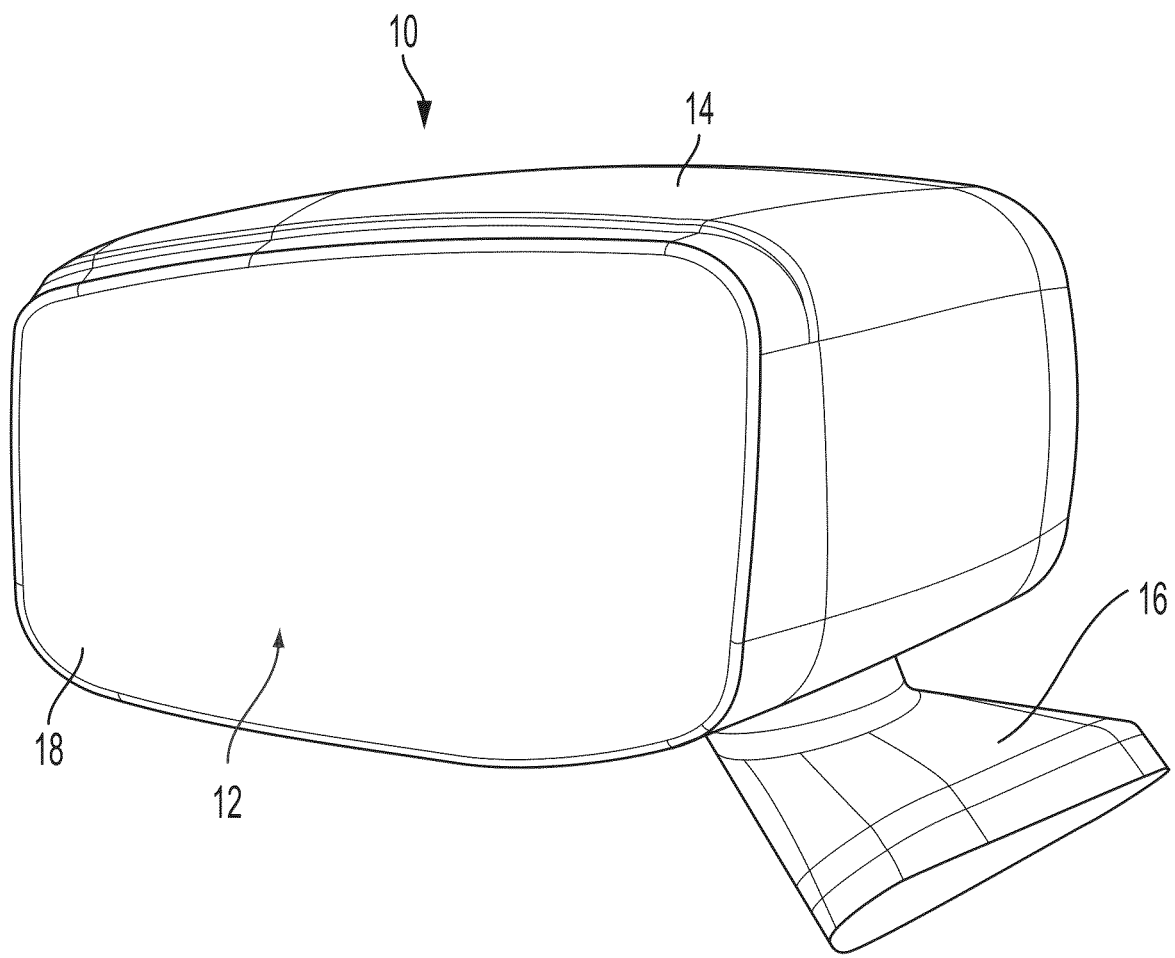
FIG. 1 is a perspective view of an exterior rearview mirror assembly in accordance with the present invention.
Figures 2, 3, 4:
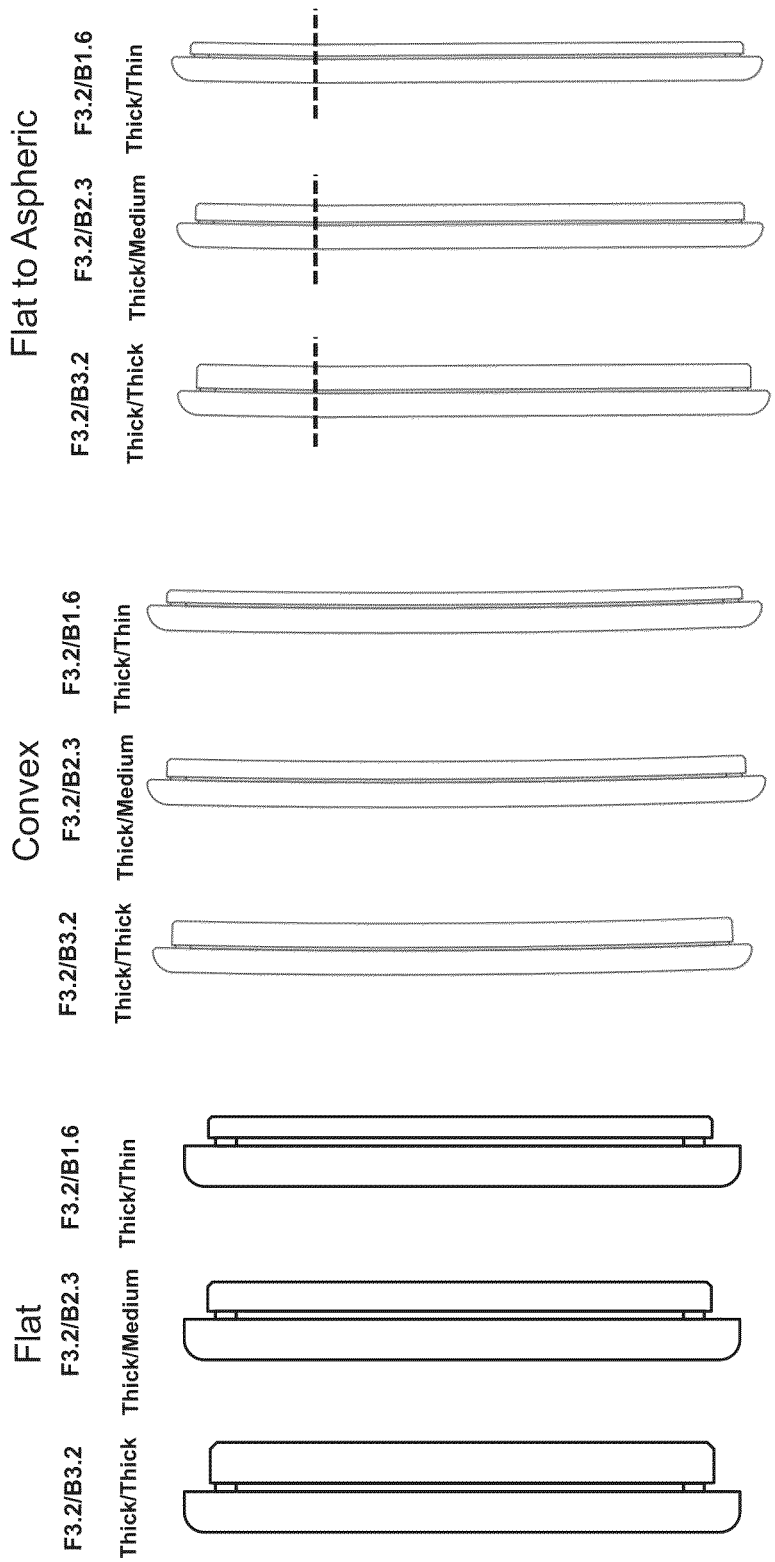
FIGS. 2-4 are side elevations of various reflective elements having a thick front glass substrate with a rounded outermost perimeter edge.
Figure 5:
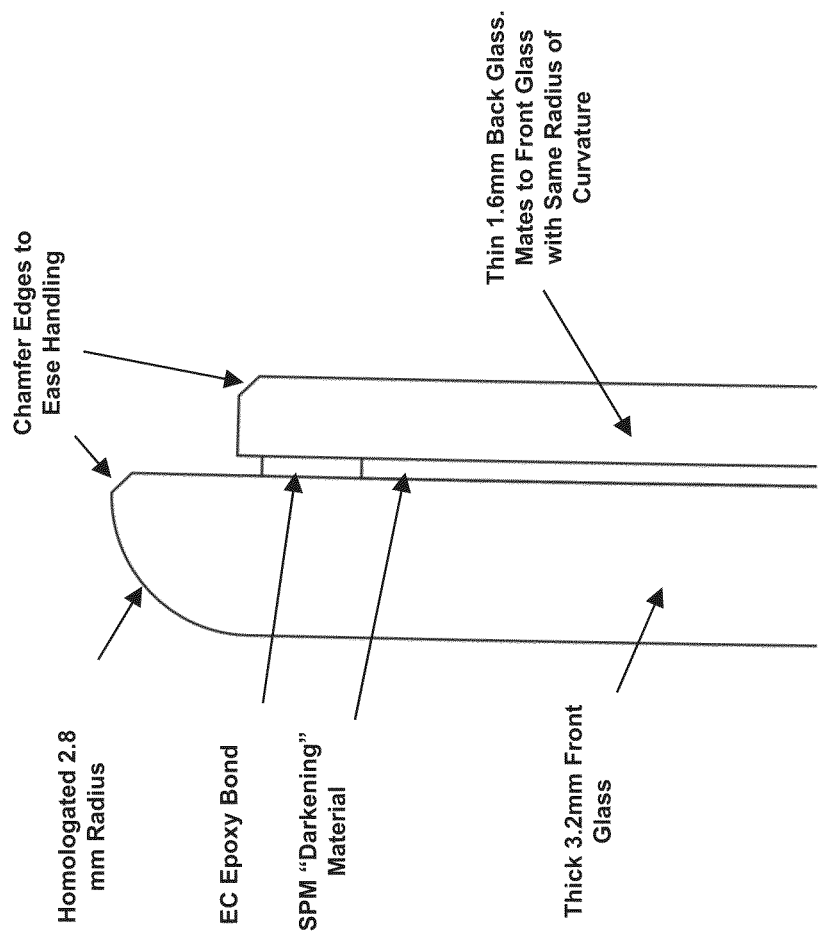
FIG. 5 is an enlarged view of a portion of a reflective element having a 3.2 mm thick front substrate with a rounded outermost perimeter edge.

Referring now to the drawings and the illustrative embodiments depicted therein, an exterior rearview mirror assembly 10 for a vehicle includes a mirror reflective element 12 received in and/or supported at or by a mirror shell or casing or head portion 14 (FIG. 1). The mirror casing or head portion 14 may be fixedly attached at a mounting arm or base 16 at the side of the vehicle or may be movably mounted to a mounting arm or base or portion 16, and may comprise a breakaway mirror (where the mirror head portion may be manually pivoted about the mounting arm or base) or may comprise a powerfold mirror (where the mirror head portion may be pivoted via an actuator assembly or adjustment device). Mounting arm or base 16 of mirror assembly 10 is mounted at the side of a host or subject vehicle, with the reflective element 12 providing a rearward field of view along the respective side of the vehicle to the driver of the vehicle, as discussed below. The mirror reflective element comprises a variable reflectance mirror reflective element that varies its reflectance responsive to electrical current applied to conductive coatings or layers of the reflective element. The electrical current is applied via electrical connectors disposed at the rear of the mirror reflective element, as discussed below. The mirror assembly may utilize aspects of the mirror assemblies described in U.S. Publication No. US-2018-0319339, which is hereby incorporated herein by reference in its entirety.

The mirror reflective element 14 (FIGS. 7 and 8) comprises a laminate construction variable reflectance electro-optic (such as electrochromic) reflective element assembly having a front substrate 18 (such as a thin glass substrate having a thickness of around 1.6 mm) and a rear substrate 20 (such as a thin glass substrate having a thickness of around 1.6 mm) with an electro-optic medium 22 (such as electrochromic medium or solid polymer matrix (SPM) darkening material) sandwiched therebetween and bounded by a perimeter seal 24 (comprising an epoxy bond that bonds the front substrate to the rear substrate and defines or circumscribes the interpane cavity of the EC medium). The front substrate 18 has a front or first surface (the surface that generally faces the driver of a vehicle when the mirror assembly is normally mounted at the vehicle) and a rear or second surface opposite the front surface, and the rear substrate 20 has a front or third surface and a rear or fourth surface opposite the front surface, with the electro-optic medium disposed between the second surface and the third surface and bounded by the perimeter seal of the reflective element (such as is known in the electrochromic mirror art). Thus, the third surface of the rear substrate 20 is closer to the front substrate 18 than the fourth surface of the rear substrate 20 when the front substrate 18 and the rear substrate 20 are bound together via the perimeter seal 24.

The second surface has a transparent conductive coating established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface has a metallic reflector coating (or multiple layers or coatings) established thereat. The front or third surface of the rear substrate 20 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255, 451; 7,195,381; 7,184,190; 6,690,268; 5,140,455; 5,151, 816; 6,178,034; 6,154,306; 6,002,511; 5,567,360; 5,525, 264; 5,610,756; 5,406,414; 5,253,109; 5,076,673; 5,073, 012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The mirror reflective element has curved or rounded perimeter edges, such as described in U.S. Pat. Nos. 9,598, 016; 9,346,403; 8,730,553 and/or 8,508,831, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

The reflective element's curved or rounded appearance is achieved by rounding both the front and rear substrates, such as by grinding and polishing the assembled mirror cell (the front and rear substrates with the electro-optic medium sandwiched therebetween and bounded by a perimeter seal). As shown in FIGS. 2-5, a typical frameless design may have the front substrate (having a thickness of 2 mm-3.2 mm) rounded about its periphery (and having a radius of curvature of at least about 2.5 mm), and then attached at the rear substrate (having a thickness of around 1.1 mm to 1.6 mm to 2.3 mm or thereabouts). The radius of curvature of the rounded exposed edge thus may be provided solely by the front glass substrate. The rear substrate is then nested into the mirror casing while the front substrate is exposed and the curved or rounded edge regions provide a smooth continuous transition from the planar front surface of the front substrate to the side wall of the mirror casing. In order to meet the regulatory and other requirements, glass thicknesses have been increased to allow for suitable geometry on the finished frameless mirror. Such convex EC reflective elements typically comprise a thicker 3.2 mm front glass, which promotes greater strength than traditional outside mirror glass of medium (e.g., 2.3 mm) thickness. The thicker front glass also allows for a polished or frosted homologated rounded outermost perimeter edge having at least 2.5 mm radius of curvature. The homologated edge meets regulatory requirements for exposed edges on the outside of a vehicle. Thinner rear glass substrates may be used to aid in conforming the curvature of the rear substrate to the curvature of the front glass and a reduction of weight.

Figure 6:
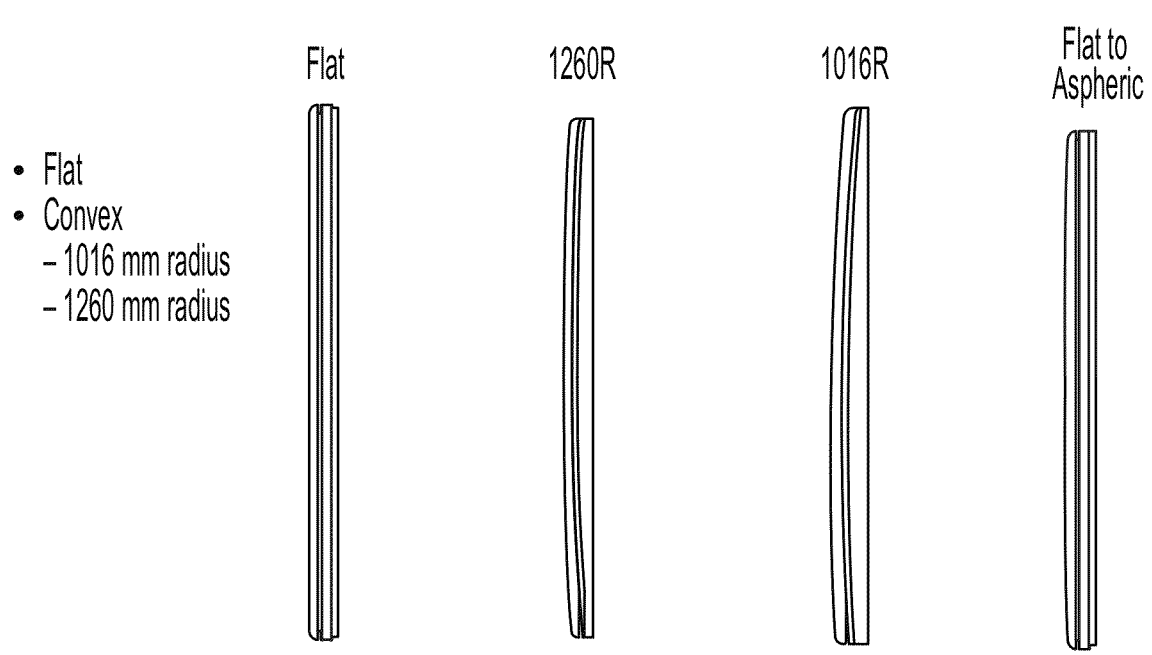
FIG. 6 shows side elevations of reflective elements having thicker rear glass substrates to provide or correspond with a desired curvature of the front glass substrate.
Figure 9:
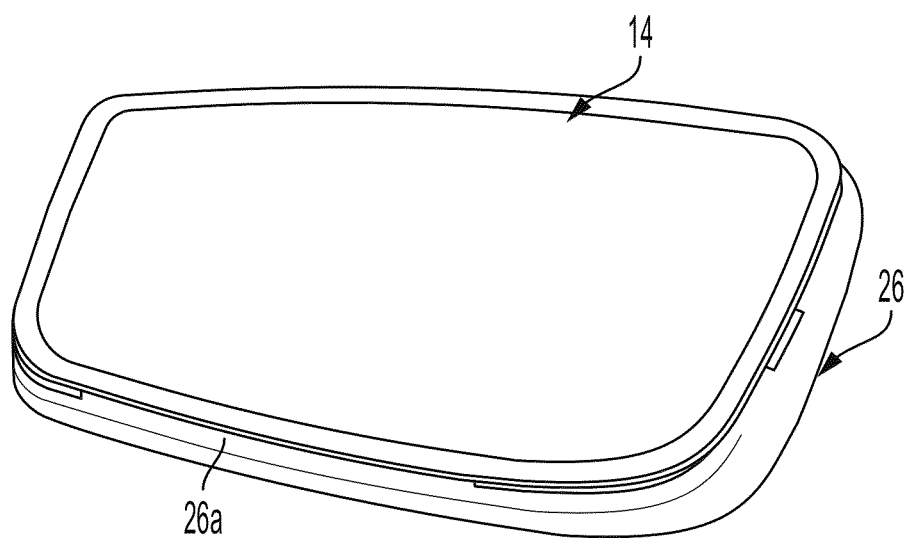
FIG. 9 is a perspective view of a mirror sub-assembly having a reflective element of FIG. 7 with a cutout at a lower region of the glass substrate and with a portion of the mirror back plate formed to be received at the cutout.

As shown in FIG. 6, the mirror reflective element may be made with a thicker rear substrate and a thinner front substrate (having a thickness of around 1.1 mm or 1.6 mm or 2.3 mm or thereabouts) while maintaining compliance with regulatory requirements for exposed edges. The rear substrate may be formed or shaped to provide a third surface that is flat or curved to match the second surface of the front substrate while providing a flat rear or fourth surface for attaching to the back plate or attachment element. The examples of FIG. 6 include a flat mirror reflective element (having unit magnification), and curved elements having a radius of curvature of 1260 mm or 1016 mm (or any other suitable radius of curvature), and a curved element having a planar or flat principal viewing region and an auxiliary or wide angle aspheric region. In all of the examples, the edges of the front and rear substrates substantially align to create a continuous rounded edge from the front or first surface of the front substrate to the peripheral edge of the front substrate, peripheral edge of the rear substrate, and side wall of the mirror casing. Thus, the radius of curvature of the rounded exposed edge may be provided by the combination of the front and rear glass substrates.

Another solution to satisfy the homologated edge regulation but provide mass reduction over traditional methods is to mate two pieces of thin 1.6 mm thick glass and then grind and polish or frost the edge across both pieces of glass. This can also be satisfied with a medium 2.3 mm front glass substrate and a thin 1.6 mm rear glass substrate for added strength.

As can be seen with reference to FIGS. 7 and 8, the mirror reflective element 14 of the present invention has the EC mirror cell (comprising the front substrate 18 and the rear substrate 20 laminated together with the electrochromic medium 22 disposed therebetween and bounded by a perimeter seal 24) assembled and then ground and polished to provide the desired curved or rounded perimeter edge over the perimeter regions of the front substrate and the rear substrate. In such an embodiment, the front and rear glass substrates may comprise thinner substrates, such as around 1.6 mm each (which is thinner than the front substrate of known mirror constructions). By grinding two thin glass substrates after assembly as a cell, the required edge can be provided over the combination of the two substrates thus forming an EC mirror cell that appears to be formed from a single glass substrate, but that is actually formed from a front substrate and rear substrate laminated together.

The curved perimeter edges of the front and rear substrates cooperate or combine to provide the curved transition between the outer surface of the mirror casing and the front or first surface of the front glass substrate. The curved perimeter edges of the front and rear substrates may have the same radius of curvature to provide a smooth continuous-curvature rounded transition between the outer surface of the mirror casing and the front or first surface of the front glass substrate, or the curved perimeter edges of the front and rear glass substrates may have different radii of curvature (for example, the curved surface of the perimeter edge of the rear glass substrate may have a larger radius of curvature as compared to the curved surface of the perimeter edge of the front glass substrate) to provide either a steeper or shallower transition between the outer surface of the mirror casing and the front or first surface of the front glass substrate.

The perimeter seal is small enough at or near the exposed perimeter so to not be highly or readily visible. Optionally, the perimeter regions of the front and/or rear substrates may include an opaque perimeter band or coating to conceal the seal about the periphery of the mirror cell. Optionally, the seal may comprise a hardened material at least at its outer region that can be ground and polished with the glass substrates to form the smooth curved or rounded transition surface between the planar front surface of the front substrate and the rear edge region of the rear substrate or the exterior surface of the mirror casing.

In order to power or electrify the electrically conductive second and third surface coatings (so as to vary the transmission through the electro-optic medium), the electrical connections must be made from the rear of the reflective element and any intrusion onto the now exposed perimeter edge of the rear substrate should be avoided or minimized such as to avoid exposure of the electrical connections exterior the mirror assembly or to avoid reducing the dimensions of the exposed edge and risk non-compliance with regulatory requirements regarding exposed edges. The EC electrification is made by creating a cutout 20a along the bottom perimeter edge region of the rear glass substrate 20 to allow the location of EC positive and negative terminals. To maintain homologation along the entire perimeter of the glass, the back plate or attachment element 26 has a protrusion 26a that fills in the gap from the rear glass substrate cutout 20a and continues the homologated radius of the outer edge of the reflective element. The outer or forward surface of the protruding part of the back plate is curved or rounded to match the curved or rounded perimeter edge of the reflective element. Although shown as a cutout 20a in the rear glass substrate 20 and corresponding protrusion or lip 26a at the attachment element 26 at a lower region of the perimeter edge of the reflective element, it should be understood that the cutout and corresponding protrusion may be located anywhere along the perimeter edge of the reflective element (such as at a top portion or side portion) or may form more than one cutout and corresponding attachment element protrusion (such as one each for the positive and negative EC terminals such as at left and right side edges of the reflective element).

As shown in FIGS. 9, 10 and 13-17, the rear glass substrate 20 has a cut away 20a or recess at its lower perimeter region, which can then be concealed with a mating piece 26a of the mirror back plate 26 when the mirror reflective element is attached at the mirror back plate (and optionally with a heater pad 27 disposed between the reflective element 14 and the attachment element or back plate 26, and with the heater pad adhesively attached at the attaching surface of the back plate and with the reflective element adhesively attached at the heater pad). The back plate 26 may be disposed within a mirror casing (or its outer surface may form part of the outer part of the mirror head) and is attached at an actuator that electrically adjusts the position of the back plate and mirror reflective element (and in tandem with the mirror casing) relative to the vehicle, such as by utilizing aspects of the mirror assemblies described in U.S. Pat. Nos. 10,099,618; 9,827,913 and/or 8,915,601, and/or U.S. Publication No. US-2020-0353867, which are hereby incorporated herein by reference in their entireties.

Optionally, the lip or mating piece 26a may be disposed at or received at the notch at the rear glass substrate (and optionally at the front glass substrate), and the back plate or a separate mirror casing or bezel portion may also overlay or receive at least part of the mirror reflective element therein such that at least a portion of the back plate or mirror casing or bezel portion encompasses the perimeter edges of the rear glass substrate and front glass substrate, with no portion of the back plate or mirror casing or bezel portion extending beyond or over the front or first surface of the front glass substrate. The reflective element thus may be at least partially nested in the mirror casing with a curved or rounded outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties).

The reflective element thus provides a fully treated rounded or curved exposed perimeter surface (provided by both the front and rear substrates), with a notch along a portion of the rear substrate that may receive a portion or tab or protrusion 26a of the mirror back plate 26 therein to fill the small notch (optionally, the notch may be very small and may not have a portion of the mirror casing disposed threat). For example, and as best shown with reference to FIGS. 10, 13 and 14, a small notch or groove 20a may be provided at a perimeter region of the rear substrate 20, and electrically conductive terminals 28a, 28b may be disposed at the rear (fourth) surface of the reflective element for electrically connecting to the third surface electrically conductive mirror reflector (where the terminals 28 may be disposed at the rear or fourth surface and at the notch 20a).

The two terminals 28a, 28b are electrically isolated from one another at the rear glass substrate and provide electrical connections to the respective electrically conductive coatings at the second and third surfaces of the reflective element or cell so as to allow electrification of the electro-optic medium when the coatings or traces are powered. The second surface terminal 28b may be disposed at an area of the notch where the wrapped third surface terminal 28a is not disposed or may be electrically isolated from the terminal 28a, such as via non-electrically conductive material disposed between the coatings or via isolation lines 30 (FIG. 13) ablated or otherwise established through the electrically conductive coating(s) or the like. When the mirror reflective element is attached at the mirror back plate, the protruding portion 26a of the mirror back plate is received in the notch or groove to conceal and encase the terminals. Thus, the terminals are disposed between the protruding portion 26a of the mirror back plate and the rear glass substrate at the notch 20a formed therein.

Figure 12:
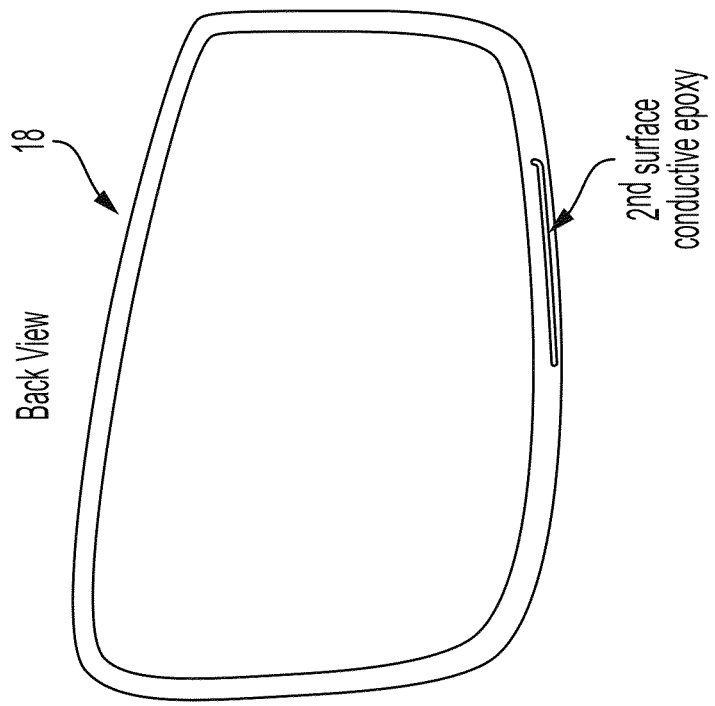
Figure 13:
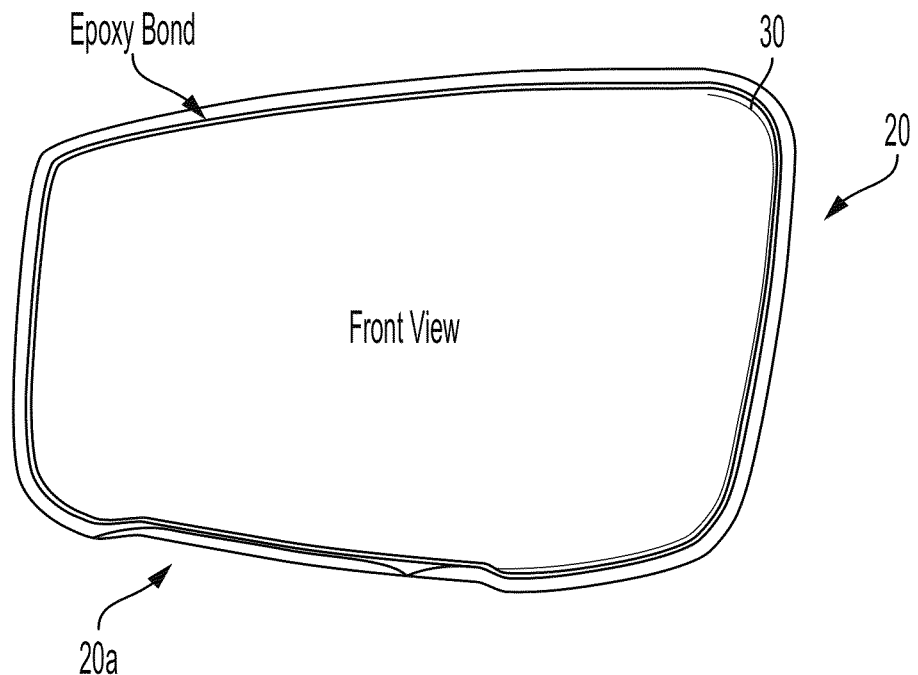
FIG. 13 is a front plan view of the rear glass substrate of the reflective element.
Figure 14:
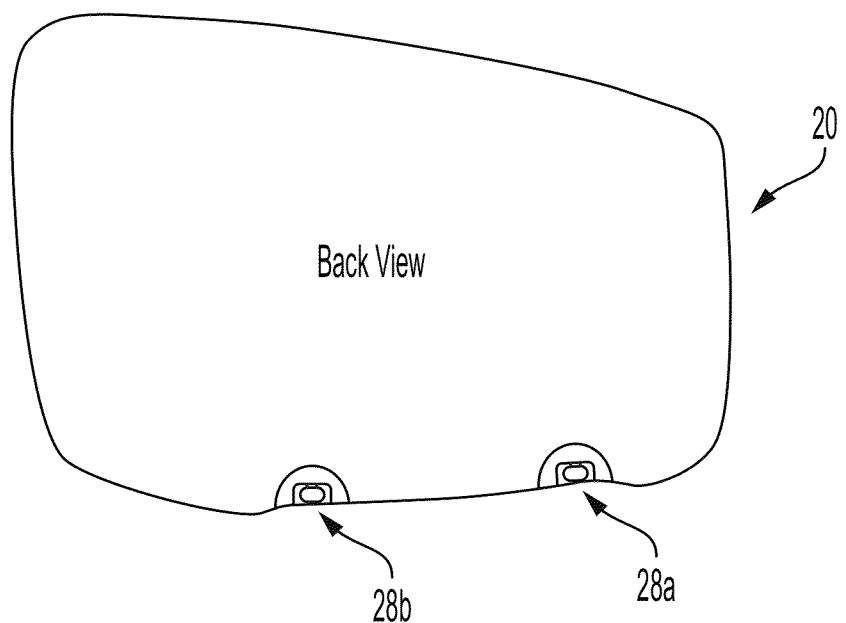
FIG. 14 is a rear plan view of the rear glass substrate of the reflective element.
Figure 15:
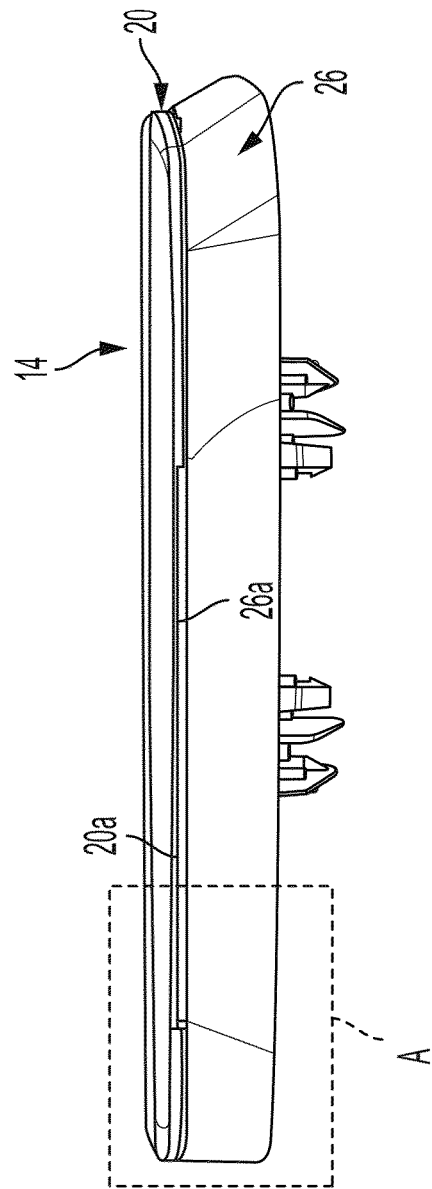
FIG. 15 is a side view of the mirror assembly of FIG. 9.
Figure 15A:
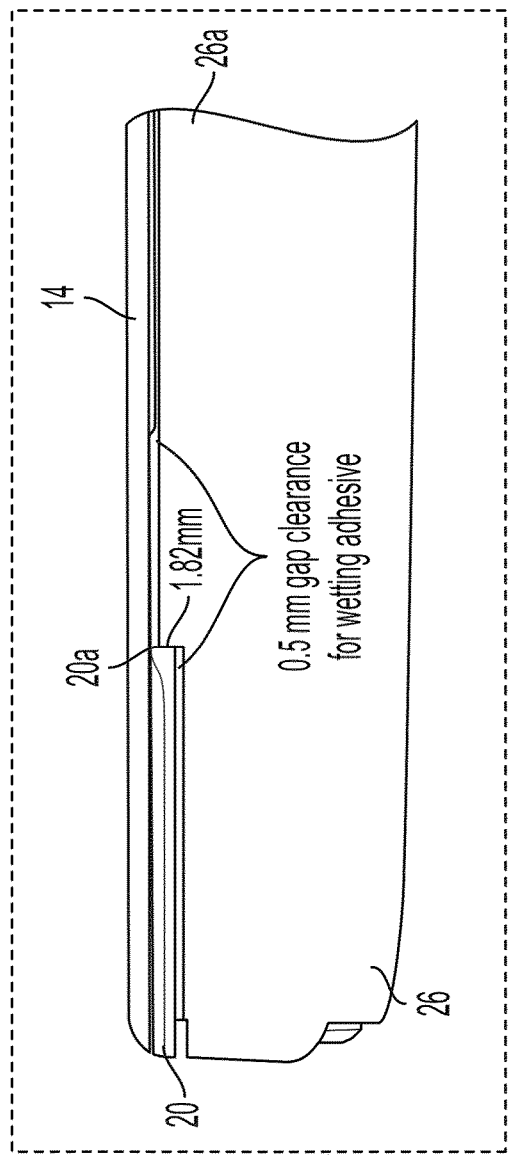
FIG. 15A is an enlarged view of the portion A of the mirror assembly of FIG. 9.
Figure 16:
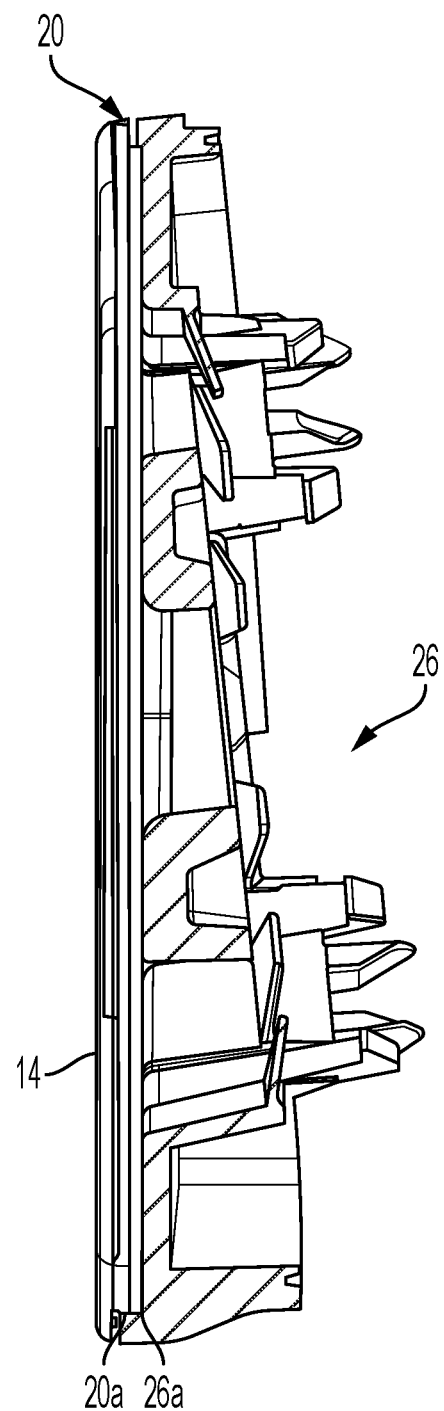
FIG. 16 is a sectional view of the mirror assembly of FIG. 15.

The protrusion 26a of the mirror back plate 26 is received at the notch or recess 20a of the rear glass substrate (see FIGS. 15, 15A and 16). The electrically conductive terminals 28 may comprise electrically conductive metal tabs or elements that wrap or extend across the perimeter edge of the rear substrate at the cutout, with the third surface terminal 28a making contact with the third surface metallic reflector at the third surface of the rear substrate, and the second surface terminal 28b either contacting the transparent electrically conductive coating at the second surface of the front substrate or contacting an electrically conductive wrap around element such as an epoxy disposed at the rear or second surface of the front glass substrate (see FIG. 12) and at the recess and in electrically conductive connection with the second surface conductive coating (and electrically isolated from the third surface terminal 28a and the third surface conductive coating).

Figure 18:
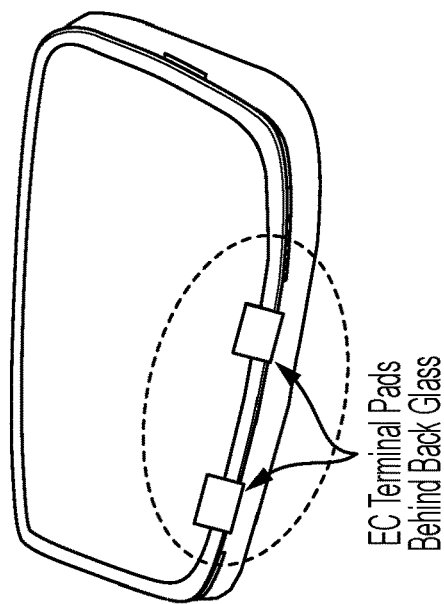
FIG. 18 is a perspective view of the mirror assembly, with the reflective element removed to show the electrical connecting elements.

As shown in FIG. 18, the electrical terminals may comprise terminal pads located behind (or at the fourth surface) of the rear glass substrate and in electrical connection with the respective electrically conductive coatings at the second and third surfaces of the reflective element. Thus, the terminals 28a, 28b may either directly contact the respective conductive surface, coating or element to which they are electrically connected (at the second or third surface of the mirror reflective element) or the terminals may be disposed at the fourth surface of the mirror reflective element and electrically connect to the second and third surfaces respectively via electrically conductive wrap around elements such as an electrically conductive epoxy or clip exposed at the fourth surface and in contact with the respective second or third surfaces (such as by utilizing aspects of the mirror reflective element assemblies described in U.S. Publication No. US-2018-0319339, which is hereby incorporated herein by reference in its entirety).

Figure 17A:
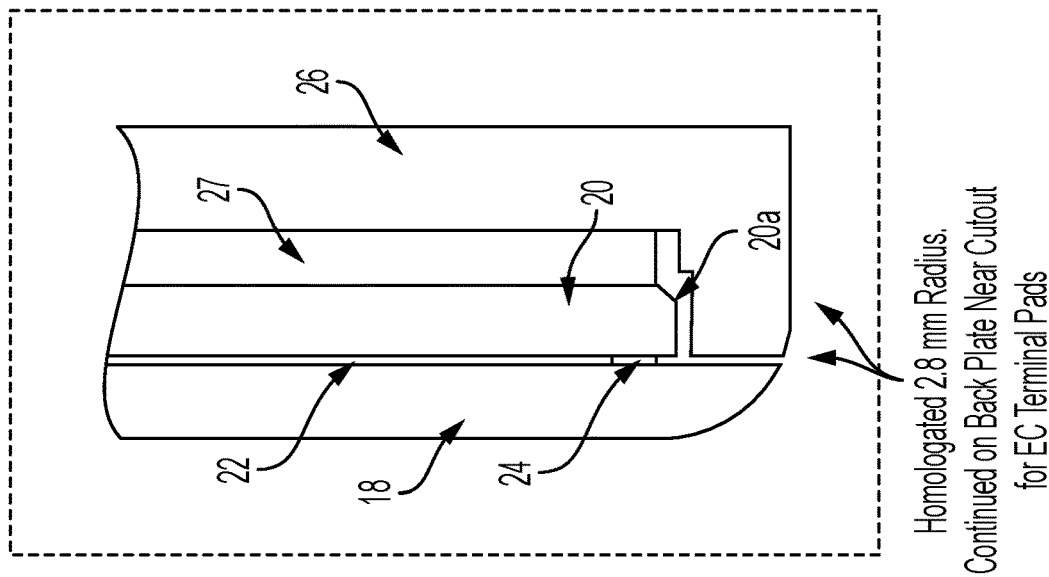
FIG. 17A is an enlarged sectional view of the lower portion A of the mirror assembly of FIG. 17.
Figure 17:
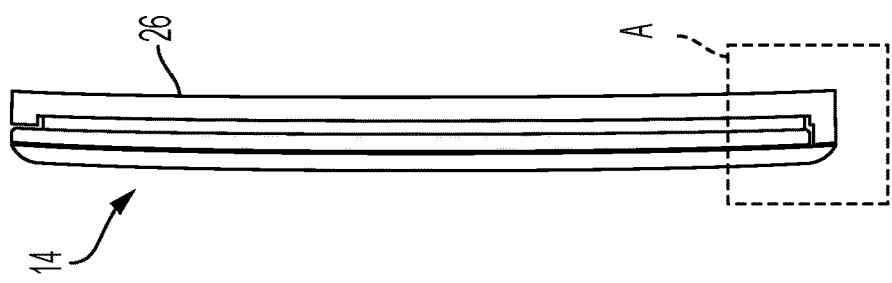
FIG. 17 is another sectional view of the mirror assembly.
Figure 19:
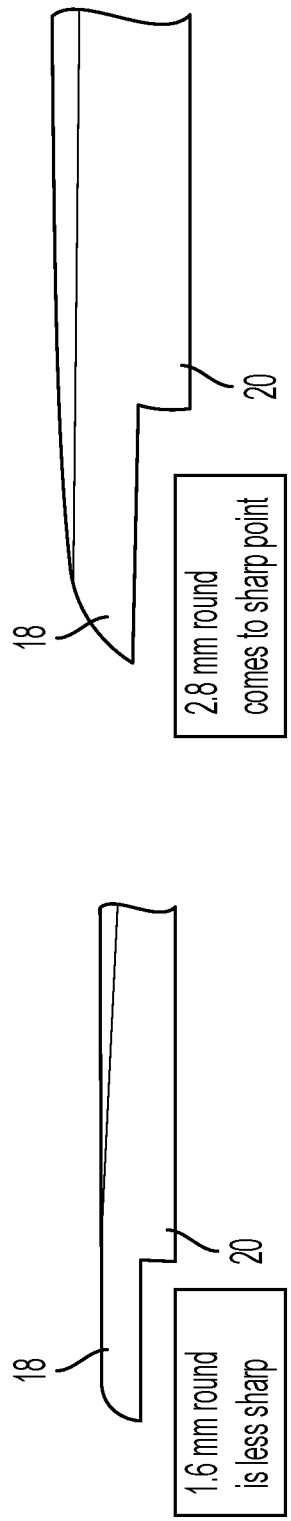
FIG. 19 shows reflective elements having different radii of curvature of the rounded outermost perimeter edge of the front glass substrate adjacent the cutout region of the rear glass substrate.
Figure 20:
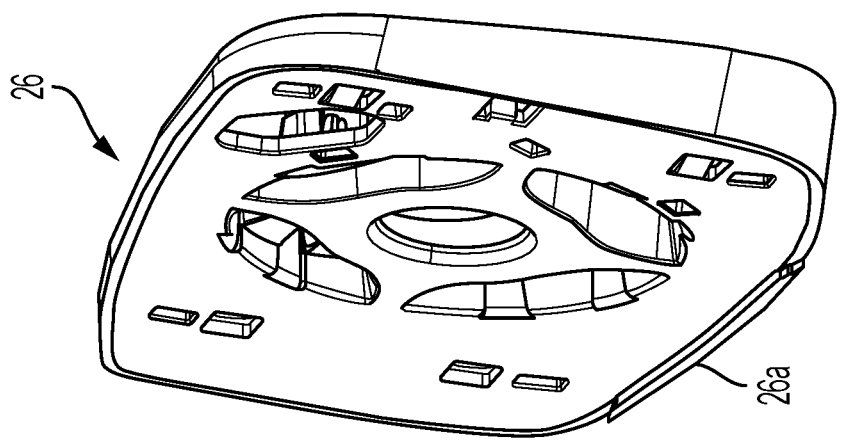

Thus, as shown in FIGS. 17, 17A, and 20, the protrusion 26a of the back plate or attachment element 26 matches the curvature and alignment of the edge of the rear glass substrate 20 at the notch 20a to provide a continuous rounded edge around the entire perimeter of the mirror reflective element. For example, FIG. 17A shows that protrusion provides a rounded edge to match and provide a continuous homologated radius of curvature with the rounded edge of the front glass substrate 18. As shown in FIG. 19, different radii of curvatures of the rounded edge of the front glass substrate (such as 1.6 mm or 2.8 mm) may require different matching curvatures of the protrusion to fill the notch in the rear glass substrate and provide the continuous rounded edge for the mirror reflective element.

The notch 20a allows for connection of electrically conductive terminals 28 at the perimeter of the frameless mirror reflective element for powering the EC mirror cell with minimal interruption to the continuous curved or rounded edge. The protrusion and notch are located at a lower portion of the mirror reflective element to virtually eliminate the appearance of the protrusion from view, but may be located at alternative locations at the perimeter of the mirror reflective element as desired or required for connection of the electrical terminals at the EC mirror cell.

As shown in FIG. 22, the cutout or recess at the rear glass substrate 20 may comprise a single recess or notch 20a along part of the lower perimeter region of the substrate to allow for the electrical connection to the second surface coating and the third surface coating via respective connectors or terminals 28a, 28b disposed at the single cutout 20a and electrically isolated from one another. Optionally, as shown in FIGS. 23 and 24, the cutout or recess may comprise separate cutouts for the respective electrical connections, such as one for a positive electrical terminal and one for a negative electrical terminal. For example, the rear substrate 20' may have a first cutout or recess 20a' and a second cutout or recess 20b' established along the lower perimeter region (or elsewhere) of the rear substrate 20' to accept connection to the separate second and third surface electrical terminals. Optionally, as shown in FIG. 23, the electrical terminals 28a', 28b' may comprise electrically conductive wires or leads, with the third surface electrical terminal 28a' extending through the first cutout or recess 20a' in the perimeter of the rear substrate 20' for attaching at the third surface of the rear substrate, and with the second surface electrical terminal 28b' extending through the second cutout or recess 20b' in the perimeter of the rear substrate 20' for attaching at the second surface of the front substrate.

Optionally, and such as shown in FIG. 24, the electrical terminals 28a", 28b" may comprise spring-loaded electrical connectors or pins (such as by utilizing aspects of the mirror assemblies and electrical connectors described in U.S. Pat. Nos. 10,466,563; 9,878,669 and/or 9,565,342, which are hereby incorporated herein by reference in their entireties), with the third surface electrical terminal 28a" extending through the first cutout or recess 20a' in the perimeter of the rear substrate 20' for attaching at the third surface of the rear substrate, and with the second surface electrical terminal 28b" extending through the second cutout or recess 20b' in the perimeter of the rear substrate 20' for attaching at the second surface of the front substrate. The spring-loaded connectors may compress as the attachment element or back plate is attached at the rear of the reflective element and maintain electrical connectivity with the respective coating due to the spring-bias of the pins into engagement with the respective coating or conductive pad or the like. The attachment element or back plate may have separate spaced apart protruding parts that are received in and fill in the respective recess, such as in a similar manner as discussed above. The spring-loaded connector for the third surface conductive coating may engage a wrap-around coating at the fourth surface of the rear glass substrate, with the wrap-around coating wrapping around the cutout edge to electrically connect with the third surface conductive coating of the rear glass substrate.

In embodiments with separate cutouts for the respective electrical connections, the back plate or attachment element may have separate protruding portions to match and provide the continuous edge of the mirror reflective element at both respective cutouts. Thus, the number and configuration of the protrusion or protrusions from the attachment element may match the number and configuration of the cutouts or recesses provided in the rear glass substrate to accommodate the electrical terminals to ensure a homologated rounded edge around the perimeter of the frameless mirror reflective element.

Optionally, and as shown in FIGS. 25-27, the rear substrate 20" may have holes or vias or passageways established therethrough to allow for electrical connection from contacts at the rear surface of the rear substrate to the respective electrically conductive coatings at the second and third surfaces of the cell (such as by utilizing aspects of the mirror reflective element assemblies described in U.S. Publication No. US-2018-0319339, which is hereby incorporated herein by reference in its entirety). For example, and such as shown in FIG. 26, a pair of holes or vias or passageways 20a", 20b" may be established through the rear substrate 20" within the boundary of the rear substrate, whereby electrically conductive wires or leads 28a', 28b' extend through the holes for electrical connection to the respective conductive coatings. For example, the third surface electrical terminal 28a' extends through the first hole 20a" for attaching at the third surface of the rear substrate 20" and the second surface electrical terminal 28b' extends through the second hole 20b" for attaching at the second surface of the front substrate 20". Optionally, and such as shown in FIG. 27, spring-loaded electrical connectors or pins 28a", 28b" may similarly protrude through the holes 20a", 20b" for electrical connection to the respective conductive coatings at the third and second surfaces. Optionally, the electrically conductive material at the third surface of the rear substrate may be disposed at and in one of the holes or passageways and may wrap around the third and fourth surfaces to establish electrically conductive continuity between the fourth surface and the third surface coatings.

Figure 10:
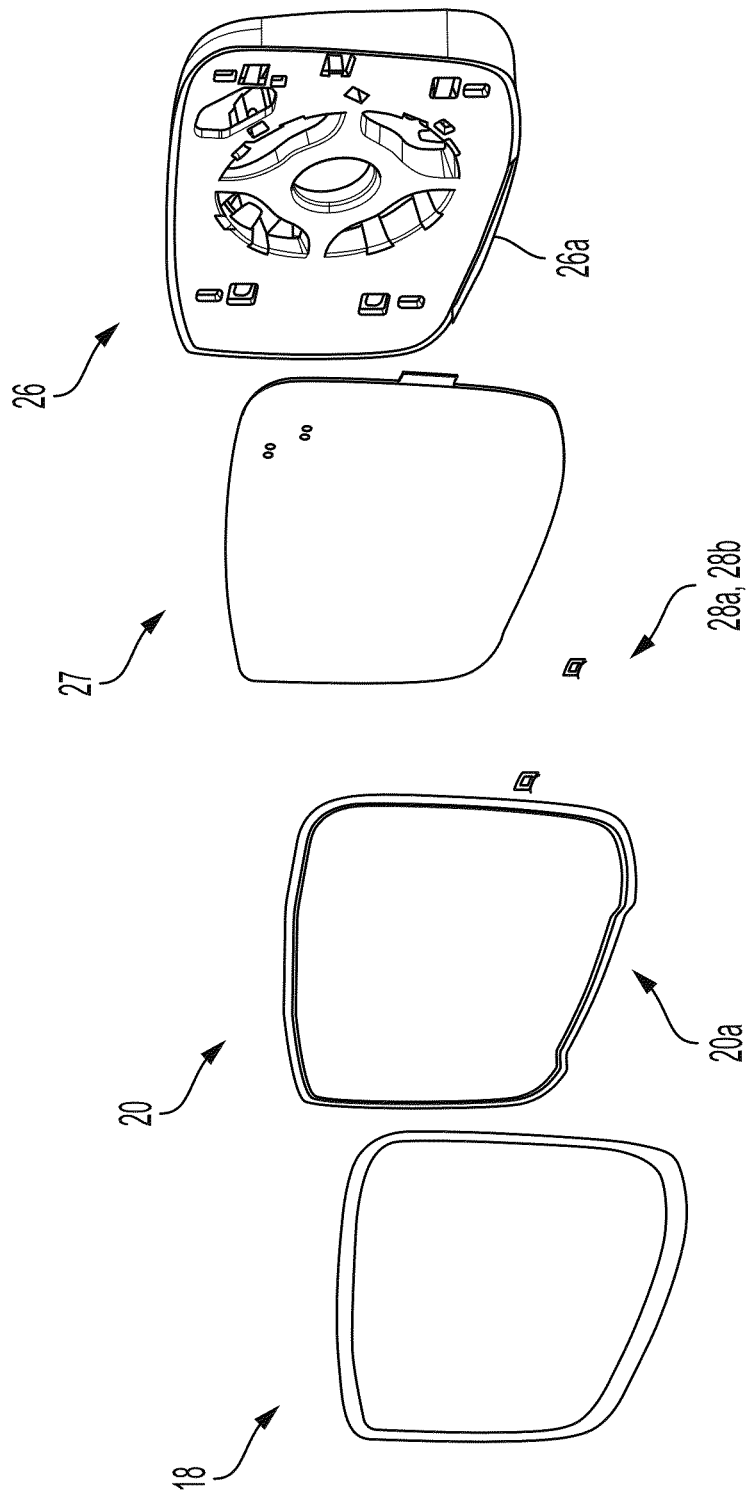
FIG. 10 is an exploded perspective view of the mirror sub-assembly of FIG. 9.
Figure 11:
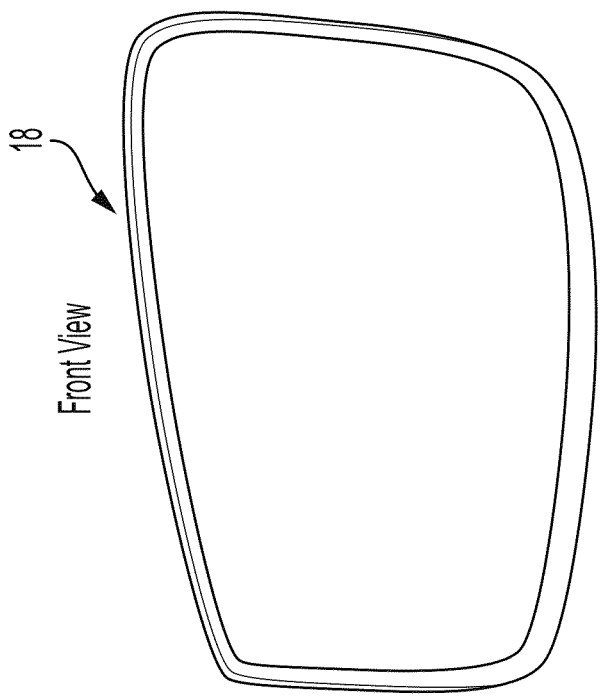
FIGS. 11 and 12 are plan views of the reflective element.
Figure 21:
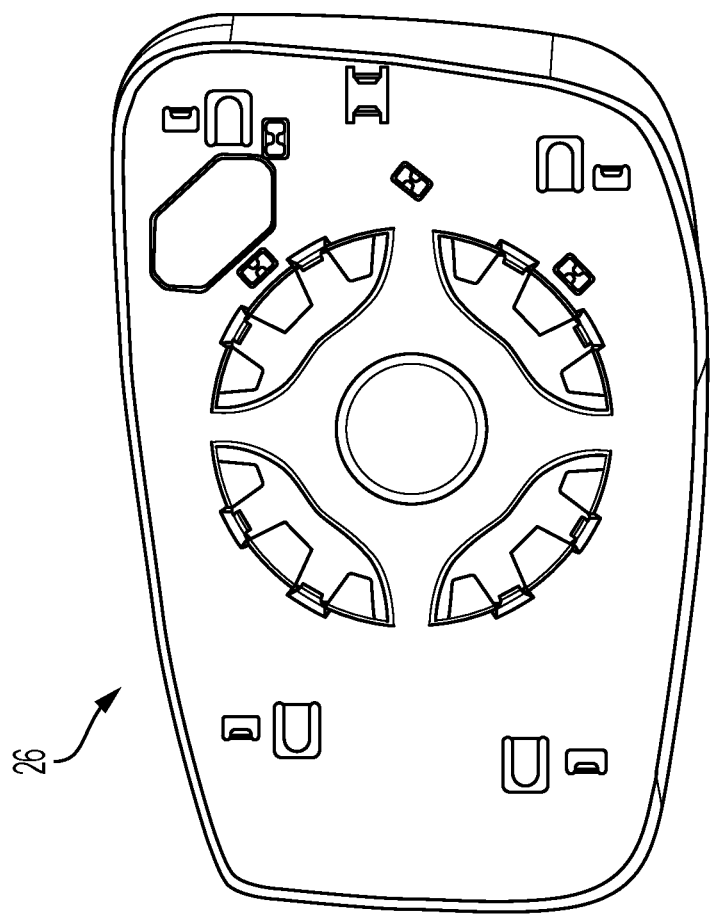
FIGS. 20 and 21 are perspective views of the mirror back plate, with a lower protrusion for filling in the cutout region of the reflective element.

As shown in FIGS. 10, 20 and 21, the attachment element or back plate 26 comprises a plastic injection molded structure with an attaching surface at which the heater pad 27 and reflective element 12 are attached. The electrically conductive terminals 28a, 28b are disposed at the notch or holes of the rear substrate and electrically connected to the respective conductive coatings at the front and rear glass substrates. The terminals are also electrically connected to circuitry or wires at the attachment element, such as wires or elements that extend through one or more passageways through the attaching surface of the attachment element (or optionally wires or elements that are insert molded in the attachment element with exposed contacts at each side of the attachment element), such that the circuitry or wires are electrically connected to circuitry or wires in the mirror head when the attachment element (with the reflective element attached thereto) is attached at the mirror head (such as when attached at an electrically operable actuator in the mirror head). The attachment element 26 further includes a protrusion 26a that matches or fills a notch 20a in the rear glass substrate 20. The protrusion, at an outer surface, may match the curvature of the rear glass substrate to provide the continuous rounded edge from the front surface of the front glass substrate to the side wall of the mirror casing. The protrusion 26a may also support or otherwise enable the connection of electrical terminals to the respective second and third surfaces of the mirror reflective element at the notch in the rear glass substrate.

Thus, the exterior rearview mirror assembly includes a mirror reflective element attached at an actuator (via an attachment element or back plate) that is operable to adjust the mirror reflective element relative to a mounting arm or base portion (that fixedly attaches such as via bolts at the vehicle, and such as via bolting at a front door portion of the vehicle). The mirror head comprises the mirror reflective element, the back plate and the mirror casing, which all may be adjusted together and in tandem when the actuator is operated. The mirror reflective element attaches to the polymeric molded mirror backing plate, which, at one side, supports the mirror reflective element (and typically with a heater pad disposed therebetween), and at the other opposing side, includes structure for mounting at the mirror actuator. The mirror head may include other electrically operated accessories, such as a lane change alert or blind spot alert indicator or turn signal indicator or the like, and the backing plate and/or structure may utilize aspects of the mirror assemblies described in U.S. Pat. Nos. 8,058,977; 7,944,371 and/or 7,581,859, which are hereby incorporated herein by reference in their entireties.

The mirror head is adjustable relative to the base portion (such as at an outer end portion of the base portion) via the actuator fixedly attached at a bracket portion of the mirror assembly. The mounting post or structure of the base portion may be received through or disposed at a gap or opening or aperture of the mirror casing, with the opening providing clearance or a gap between the casing wall and the mounting post to allow for adjustment of the mirror casing and reflective element (the mirror head) relative to the base portion, without direct contact or fouling between the mirror casing and the base portion during mirror head adjustment (but optionally with sealing and/or sliding contact between a gasket or seal and the mirror casing and/or base portion, as discussed below). The mirror casing may be formed by polymeric molding (such as injection molding) and the opening or hole or aperture may be established through the mirror casing during the molding of the mirror casing.

Therefore, the present invention provides for an electro-optic mirror reflective element that has a rounded or curved exposed perimeter edge that spans both the front substrate and the rear substrate. Thus, the present invention can provide the desired rounded exposed edge of the mirror, while making the mirror substrates (particular the front substrate) out of a thinner glass material and maintaining compliance with regulations for exposed edges. The front and rear glass substrates may have curved edges with the same radius of curvature (to provide a continuous radius of curvature from the front surface to the side wall of the mirror casing) or with different radii of curvature (to provide a steeper or shallower transition curved edge between the front surface and the side wall of the mirror casing). Furthermore, the rear glass substrate may have a flat or non-rounded edge (FIG. 6) that provides a continuous transition from the front glass substrate edge to the side wall of the mirror casing.

The electrical connections to the electrically conductive coatings at the opposing (second and third) surfaces of the front and rear substrates are made in a way that avoids any connections or elements exposed at the periphery of the mirror cell, since substantially the entirety of the periphery of the cell is exposed when the reflective element is mounted at a mirror casing and mounted in a vehicle. For example, a notch is made in the rear glass substrate for attaching the electrical terminals at the respective surfaces via access provided to the surfaces at the notch. A protrusion from the rear attachment plate matches the curved edge of the rear glass substrate to provide a continuous curved edge with the front glass substrate, with the electrical terminals being disposed between the protrusion and the notched edge of the rear glass substrate. When the front glass substrate and rear glass substrate both comprise a thin (e.g., 1.6 mm) glass substrate and the edges of the front and rear glass substrates are ground together to form the combined continuous curved edge, the rear glass profile near the location of the EC terminals near the bottom of the glass is cut back to allow for EC terminal connection. To meet the regulation for the homologated edge at this location, the back plate is extended (or provides a protruding lip) to meet the front glass and continue the rounded homologated edge. Optionally, the front glass substrate may also be slightly notched or recessed, such that the protruding part of the attachment element also is partially received at the notch at the front glass substrate. Optionally, and as can be seen with reference to FIG. 19, the rounded perimeter edge of the front glass substrate may have a radius of curvature of at least 2.5 mm (such as 2.8 mm or thereabouts) around the entire periphery, or the rounded perimeter edge of the front glass substrate may have a reduced radius of curvature at the cutout region (such as, for example, a 1.6 mm radius of curvature or thereabouts), and the at least 2.5 mm (such as 2.8 mm or thereabouts) around the rest of the periphery of the reflective element.

During assembly of the mirror reflective element at the casing, the rear substrate of the reflective element may attach at an attachment element of the mirror head. For example, the fourth surface of the rear substrate may be adhesively attached at an attaching surface or portion of the attachment element of the mirror head (such as at an attachment surface of the mirror back plate), and optionally with a heater pad disposed between the fourth surface of the rear substrate and the attachment element. Optionally, the attachment element may comprise an attachment plate that is configured to snap attach at an electrically operated actuator of the mirror assembly or at an internal structure of the mirror head to attach the electro-optic reflective element assembly at the mirror head. When the electro-optic reflective element assembly is attached at the mirror head, both the front substrate and the rear substrate are exposed and rounded (such as via grinding and polishing of the glass edges) to provide a smooth continuous curved surface (having a radius of curvature of at least 2.5 mm, such as about 2.8 mm or thereabouts) from the planar front or first surface of the front substrate to an exterior wall or surface of the mirror casing.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; 7,255,451; 8,508,831 and/ or 8,730,553, and/or U.S. Pat. Pub. No. US-2006-0061008, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A method for assembling an electrochromic mirror reflective element for a vehicular rearview mirror assembly, the method comprising:

provide a front glass substrate and a rear glass substrate;

wherein the front glass substrate has a first surface and a second surface separated by a thickness of the front glass substrate, and wherein the front glass substrate has a first perimeter edge spanning between the first surface and the second surface, the first surface being closer than the second surface to a driver of a vehicle when an assembled vehicular exterior rearview mirror assembly that includes the assembled electrochromic mirror reflective element is mounted at the vehicle that is being driven by the driver;

wherein the thickness of the front glass substrate is less than 2.3 mm;

disposing a transparent electrically conductive coating at the second surface of the front glass substrate;

wherein the rear glass substrate has a third surface and a fourth surface separated by a thickness of the rear glass substrate, and wherein the rear glass substrate has a second perimeter edge spanning between the third and fourth surfaces;

wherein the thickness of the rear glass substrate is less than or equal to 2.3 mm;

disposing an electrically conductive coating at the third surface of the rear glass substrate;

wherein the thickness of the front glass substrate and the thickness of the rear glass substrate combine to have an overall thickness of at least 2.5 mm;

joining the front glass substrate to the rear glass substrate via establishing a perimeter seal between the second surface of the front glass substrate and the third surface of the rear glass substrate, wherein an interpane cavity is established between the front glass substrate and the rear glass substrate and bounded by the perimeter seal;

disposing an electrochromic medium within the interpane cavity;

with the front glass substrate joined with the rear glass substrate by the perimeter seal, and with the electrochromic medium disposed within the interpane cavity, grinding the first and second perimeter edges to round the first and second perimeter edges to provide a rounded perimeter edge of the electrochromic mirror reflective element; and wherein the rounded perimeter edge of the electrochromic mirror reflective element has a radius of curvature of at least 2.5 mm.

2. The method of claim 1, wherein the assembled electrochromic mirror reflective element is configured to attach at a mirror head of the vehicular rearview mirror assembly.

3. The method of claim 2, wherein, with the formed electrochromic mirror reflective element attached at the mirror head of the vehicular rearview mirror assembly, the rounded first and second perimeter edges provide a curved transition from the first surface of the front glass substrate to an outer surface of the mirror head.

4. The method of claim 3, wherein the first and second perimeter edges provide a consistent curved transition from the first surface of the front glass substrate and the outer surface of the mirror head.

5. The method of claim 3, wherein the first and second perimeter edges are rounded with different radii of curvature to provide the curved transition from the first surface of the front glass substrate and the outer surface of the mirror head.

6. The method of claim 3, wherein the first and second perimeter edges are each rounded with the same radius of curvature to provide a constant curved transition from the first surface of the front glass substrate and the outer surface of the mirror head.

7. The method of claim 2, comprising forming a notched region of the rear glass substrate, and wherein the notched region is configured to receive a protruding portion of the mirror head when the assembled electrochromic mirror reflective element is attached at the mirror head, and wherein an outer surface of the protruding portion of the mirror head corresponds with the second perimeter edge of the rear glass substrate at the notched region of the rear glass substrate.

8. The method of claim 7, wherein the outer surface of the protruding portion provides a curved transition from the outer surface of the mirror head toward the first surface of the front glass substrate.

9. The method of claim 7, wherein the protruding portion of the mirror head comprises two protruding portions that are at least partially received at respective notched regions of the rear glass substrate, and wherein outer surfaces of the protruding portions of the mirror head correspond with the second perimeter edge of the rear glass substrate adjacent to the respective notched regions.

10. The method of claim 9, comprising wrapping respective electrically conductive connecting elements around the rear glass substrate at respective notched regions of the rear glass substrate to electrically connect to respective ones of the transparent electrically conductive coating at the second surface of the front glass substrate and the electrically conductive coating at the third surface of the rear glass substrate.

11. The method of claim 7, wherein the protruding portion of the mirror head is received at the notched region of the rear glass substrate and at least partially received at a notched region of the front glass substrate, and wherein the outer surface of the protruding portion of the mirror head corresponds with the second perimeter edge of the rear glass substrate and at least a portion of the first perimeter edge of the front glass substrate.

12. The method of claim 1, comprises (i) providing a first electrically conductive connecting element at the electrochromic mirror reflective element and in electrically conductive continuity with the transparent electrically conductive coating at the second surface of the front glass substrate and (ii) providing a second electrically conductive connecting element at the electrochromic mirror reflective element and in electrically conductive continuity with the electrically conductive coating at the third surface of the rear glass substrate.

13. The method of claim 12, wherein providing the first and second electrically conductive connecting elements comprises disposing the first and second electrically conductive connecting elements in respective first and second passageways established through the rear glass substrate, and wherein the first passageway is electrically isolated from the second passageway and the electrically conductive coating at the third surface of the rear glass substrate.

14. The method of claim 12, wherein the first electrically conductive connecting element is in electrically conductive continuity with the transparent electrically conductive coating at the second surface of the front glass substrate and a first discrete connector location at the fourth surface of the rear glass substrate, and wherein the second electrically conductive connecting element is in electrically conductive continuity with the electrically conductive coating at the third surface of the rear glass substrate and a second discrete connector location at the fourth surface of the rear glass substrate.

15. The method of claim 14, wherein the first and second electrically conductive connecting elements comprise electrically conductive epoxy.

16. The method of claim 1, wherein the fourth surface of the rear glass substrate is configured to be adhesively attached at an attaching surface of a mirror head.

17. The method of claim 1, comprising adhesively attaching a heater pad at the fourth surface of the rear glass substrate.

18. The method of claim 1, wherein the thickness of the front glass substrate is less than or equal to 1.6 mm.

19. The method of claim 18, wherein the thickness of the rear glass substrate is less than or equal to 1.6 mm.

20. The method of claim 18, wherein the thickness of the rear glass substrate is greater than 1.6 mm.

21. The method of claim 1, comprising, prior to joining the front glass substrate to the rear glass substrate, disposing a perimeter hiding layer at a perimeter region of the second surface of the front glass substrate, wherein the perimeter seal, when established between the second surface of the front glass substrate and the third surface of the rear glass substrate, is behind and is hidden by the perimeter hiding layer.

22. A method for assembling an electrochromic mirror reflective element for a vehicular rearview mirror assembly, the method comprising:

providing a front glass substrate and a rear glass substrate;

wherein the front glass substrate has a first surface and a second surface separated by a thickness of the front glass substrate, and wherein the front glass substrate has a first perimeter edge spanning between the first surface and the second surface, the first surface being closer than the second surface to a driver of a vehicle when an assembled vehicular exterior rearview mirror assembly that includes the assembled electrochromic mirror reflective element is mounted at the vehicle that is being driven by the driver;

wherein the thickness of the front glass substrate is less than or equal to 1.6 mm;

disposing a transparent electrically conductive coating at the second surface of the front glass substrate;

disposing a perimeter hiding layer at a perimeter region of the second surface of the front glass substrate;

wherein the rear glass substrate has a third surface and a fourth surface separated by a thickness of the rear glass substrate, and wherein the rear glass substrate has a second perimeter edge spanning between the third and fourth surfaces;

wherein the thickness of the rear glass substrate is greater than or equal to 1.6 mm;

disposing an electrically conductive coating at the third surface of the rear glass substrate;

wherein the thickness of the front glass substrate and the thickness of the rear glass substrate combine to have an overall thickness of at least 2.5 mm;

joining the front glass substrate to the rear glass substrate via establishing a perimeter seal between the second surface of the front glass substrate and the third surface of the rear glass substrate, wherein an interpane cavity is established between the front glass substrate and the rear glass substrate and bounded by the perimeter seal;

wherein the perimeter seal, when established between the second surface of the front glass substrate and the third surface of the rear glass substrate, is behind and is hidden by the perimeter hiding layer;

disposing an electrochromic medium within the interpane cavity;

with the front glass substrate joined with the rear glass substrate by the perimeter seal, and with the electrochromic medium disposed within the interpane cavity, grinding the first and second perimeter edges to round the first and second perimeter edges to provide a rounded perimeter edge of the electrochromic mirror reflective element;

wherein the rounded perimeter edge of the electrochromic mirror reflective element has a radius of curvature of at least 2.5 mm; and wherein the assembled electrochromic mirror reflective element is configured to attach at a mirror head of the vehicular rearview mirror assembly.

23. The method of claim 22, wherein, with the formed electrochromic mirror reflective element attached at the mirror head of the vehicular rearview mirror assembly, the rounded first and second perimeter edges provide a curved transition from the first surface of the front glass substrate to an outer surface of the mirror head.

24. The method of claim 22, comprising forming a notched region of the rear glass substrate, and wherein the notched region is configured to receive a protruding portion of the mirror head when the assembled electrochromic mirror reflective element is attached at the mirror head, and wherein an outer surface of the protruding portion of the mirror head corresponds with the second perimeter edge of the rear glass substrate at the notched region of the rear glass substrate.

25. The method of claim 24, wherein the outer surface of the protruding portion provides a curved transition from the outer surface of the mirror head toward the first surface of the front glass substrate.

26. The method of claim 24, wherein the protruding portion of the mirror head comprises two protruding portions that are at least partially received at respective notched regions of the rear glass substrate, and wherein outer surfaces of the protruding portions of the mirror head correspond with the second perimeter edge of the rear glass substrate adjacent to the respective notched regions.

27. The method of claim 26, comprising wrapping respective electrically conductive connecting elements around the rear glass substrate at respective notched regions of the rear glass substrate to electrically connect to respective ones of the transparent electrically conductive coating at the second surface of the front glass substrate and the electrically conductive coating at the third surface of the rear glass substrate.

28. The method of claim 27, wherein the electrically conductive connecting elements comprise electrically conductive epoxy.

29. The method of claim 22, wherein the fourth surface of the rear glass substrate is configured to be adhesively attached at an attaching surface of a mirror head.

30. The method of claim 22, comprising adhesively attaching a heater pad at the fourth surface of the rear glass substrate.

31. A method for assembling an electrochromic mirror reflective element for a vehicular rearview mirror assembly, the method comprising:

providing a front glass substrate and a rear glass substrate;

wherein the front glass substrate has a first surface and a second surface separated by a thickness of the front glass substrate, and wherein the front glass substrate has a first perimeter edge spanning between the first surface and the second surface, the first surface being closer than the second surface to a driver of a vehicle when an assembled vehicular exterior rearview mirror assembly that includes the assembled electrochromic mirror reflective element is mounted at the vehicle that is being driven by the driver;

wherein the thickness of the front glass substrate is less than 2.3 mm and greater than 1.6 mm;

disposing a transparent electrically conductive coating at the second surface of the front glass substrate;

disposing a perimeter hiding layer at a perimeter region of the second surface of the front glass substrate;

wherein the rear glass substrate has a third surface and a fourth surface separated by a thickness of the rear glass substrate, and wherein the rear glass substrate has a second perimeter edge spanning between the third and fourth surfaces;

wherein the thickness of the rear glass substrate is less than or equal to 1.6 mm;

disposing an electrically conductive coating at the third surface of the rear glass substrate;

wherein the thickness of the front glass substrate and the thickness of the rear glass substrate combine to have an overall thickness of at least 2.5 mm;

joining the front glass substrate to the rear glass substrate via establishing a perimeter seal between the second surface of the front glass substrate and the third surface of the rear glass substrate, wherein an interpane cavity is established between the front glass substrate and the rear glass substrate and bounded by the perimeter seal;

wherein the perimeter seal, when established between the second surface of the front glass substrate and the third surface of the rear glass substrate, is behind and is hidden by the perimeter hiding layer;

disposing an electrochromic medium within the interpane cavity;

with the front glass substrate joined with the rear glass substrate by the perimeter seal, and with the electrochromic medium disposed within the interpane cavity, grinding the first and second perimeter edges to round the first and second perimeter edges to provide a rounded perimeter edge of the electrochromic mirror reflective element;

wherein the rounded perimeter edge of the electrochromic mirror reflective element has a radius of curvature of at least 2.5 mm; and wherein the assembled electrochromic mirror reflective element is configured to attach at a mirror head of the vehicular rearview mirror assembly.

32. The method of claim 31, wherein, with the formed electrochromic mirror reflective element attached at the mirror head of the vehicular rearview mirror assembly, the rounded first and second perimeter edges provide a curved transition from the first surface of the front glass substrate to an outer surface of the mirror head.

33. The method of claim 31, comprising forming a notched region of the rear glass substrate, and wherein the notched region is configured to receive a protruding portion of the mirror head when the assembled electrochromic mirror reflective element is attached at the mirror head, and wherein an outer surface of the protruding portion of the mirror head corresponds with the second perimeter edge of the rear glass substrate at the notched region of the rear glass substrate.

34. The method of claim 33, wherein the outer surface of the protruding portion provides a curved transition from the outer surface of the mirror head toward the first surface of the front glass substrate.

35. The method of claim 33, wherein the protruding portion of the mirror head comprises two protruding portions that are at least partially received at respective notched regions of the rear glass substrate, and wherein outer surfaces of the protruding portions of the mirror head correspond with the second perimeter edge of the rear glass substrate adjacent to the respective notched regions.

36. The method of claim 35, comprising wrapping respective electrically conductive connecting elements around the rear glass substrate at respective notched regions of the rear glass substrate to electrically connect to respective ones of the transparent electrically conductive coating at the second surface of the front glass substrate and the electrically conductive coating at the third surface of the rear glass substrate.

37. The method of claim 36, wherein the electrically conductive connecting elements comprise electrically conductive epoxy.

38. The method of claim 31, wherein the fourth surface of the rear glass substrate is configured to be adhesively attached at an attaching surface of a mirror head.

39. The method of claim 31, comprising adhesively attaching a heater pad at the fourth surface of the rear glass substrate.

\* \* \* \* \*

UNITED STATES PATENT AND TRADEMARK OFFICE
CERTIFICATE OF CORRECTION

PATENT NO. : 12,157,414 B2
APPLICATION NO. : 18/391925
DATED : December 3, 2024
INVENTOR(S) : Michael J. Baur Page 1 of 1

It is certified that error appears in the above-identified patent and that said Letters Patent is hereby corrected as shown below:

In the Specification

<u>Column 3</u>
Line 49, "indium oxide (10) layers" should be --indium oxide (IO) layers--

Signed and Sealed this
Seventh Day of January, 2025

Derrick Brent
*Acting Director of the United States Patent and Trademark Office*